United States Patent
Yamada

(10) Patent No.: US 8,537,032 B2
(45) Date of Patent: Sep. 17, 2013

(54) ON-VEHICLE INFORMATION PROCESSING DEVICE, INFORMATION PROVIDING DEVICE, AND VEHICLE INFORMATION PROCESSING SYSTEM

(75) Inventor: Yuki Yamada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 13/141,212

(22) PCT Filed: Feb. 10, 2009

(86) PCT No.: PCT/JP2009/052216
§ 371 (c)(1),
(2), (4) Date: Jun. 21, 2011

(87) PCT Pub. No.: WO2010/092664
PCT Pub. Date: Aug. 19, 2010

(65) Prior Publication Data
US 2011/0279251 A1    Nov. 17, 2011

(51) Int. Cl.
*G08G 1/09* (2006.01)

(52) U.S. Cl.
USPC ........... 340/905; 340/901; 340/991; 340/993; 701/31.4; 701/36

(58) Field of Classification Search
USPC ................. 340/425.5, 425.15, 905, 991, 993, 340/907, 916, 901; 701/31.4, 36
See application file for complete search history.

(56) References Cited

U.S. PATENT DOCUMENTS

| 5,771,459 A | 6/1998 | Demery et al. |
| 6,512,464 B2 * | 1/2003 | Takahashi et al. ............ 340/905 |

FOREIGN PATENT DOCUMENTS

| CN | 101098173 | 1/2008 |
| JP | A-2001-101599 | 4/2001 |
| JP | A-2006-202199 | 8/2006 |
| JP | A-2006-306242 | 11/2006 |
| JP | A-2008-116398 | 5/2008 |
| JP | A-2008-282071 | 11/2008 |
| JP | A-2008-302746 | 12/2008 |

OTHER PUBLICATIONS

International Search Report mailed Mar. 17, 2009 issued in International Patent Application No. PCT/JP2009/052216 (with translation).

* cited by examiner

*Primary Examiner* — Steven Lim
*Assistant Examiner* — Hongmin Fan
(74) *Attorney, Agent, or Firm* — Oliff & Berridge, PLC

(57) ABSTRACT

A road-side support device which provides support information to a vehicle includes a device-side receiver unit that receives equipment information on equipment of the vehicle or detectable information detectable by a sensor unit of the vehicle, a priority calculating unit that calculates a priority of a support using the support information on the basis of the equipment information or the detectable information, and a device-side transmitter unit that transmits the support information to the vehicle on the basis of the priority. Accordingly, it is possible to improve the efficiency of processes necessary for vehicle control, driving support, or the like in the road-side support device and the vehicle.

8 Claims, 9 Drawing Sheets

ON-VEHICLE INFORMATION PROCESSING DEVICE, INFORMATION PROVIDING DEVICE, AND VEHICLE INFORMATION PROCESSING SYSTEM

TECHNICAL FIELD

The present invention relates to an in-vehicle information processing device, an information providing device, and a vehicle information processing system.

BACKGROUND ART

Hitherto, an in-vehicle information processing device has been recently known which performs processes necessary for various services such as vehicle control or driving support on the basis of sensor information acquired from an in-vehicle sensor or vehicle-external support information acquired from an vehicle-external information source (a road-side communication device, another vehicle, or the like) through communications (for example, see Patent Literature 1). When both the sensor information and vehicle-external support information similar to the sensor information can be acquired, the device described in Patent Literature 1 supports the traveling of the vehicle preferentially using sensor information.

CITATION LIST

Patent Literature

Patent Literature 1: Japanese Unexamined Patent Application Publication No. 2001-101599

SUMMARY OF INVENTION

Technical Problem

However, in the in-vehicle information processing device, even when the processes are performed preferentially using the sensor information, the vehicle-external support information unnecessary for the processes is provided from the vehicle-external information source and there is concern of an increase in communication traffic volume or an increase in overall system load. Even when the vehicle-external support information has a higher utility value than that of the sensor information, the processes necessary for the vehicle control, the driving support, or the like are performed preferentially using the sensor information and there is concern that the acquired information may not be effectively utilized.

Therefore, the invention is made to solve the above-mentioned technical problem. A goal of the invention is to provide an in-vehicle information processing device, an information providing device, and a vehicle information processing system, which can improve the efficiency of processes necessary for vehicle control, driving support, or the like.

Solution to Problem

According to an aspect of the invention, there is provided an information providing device which provides support information to a vehicle, the information providing device including: a device-side receiver unit that receives equipment information on equipment of the vehicle or detectable information detectable by an in-vehicle unit of the vehicle; a priority calculating unit that calculates a priority of a support using the support information on the basis of the equipment information or the detectable information; and a device-side transmitter unit that transmits the support information to the vehicle on the basis of the calculated priority.

According to this aspect, the equipment information on the equipment mounted in the vehicle or the detectable information detectable by the unit mounted in the vehicle can be received and the priority of the support using the support information can be calculated on the basis of the equipment information or the detectable information. Accordingly, the priority of the support using the support information is calculated on the basis of the detectable information of the vehicle. Since the support information is transmitted to the vehicle on the basis of the calculated priority, the support information associated with the support necessary for the vehicle is preferentially provided to the vehicle. As a result, it is possible to improve the efficiency of processes necessary for vehicle control, driving support, or the like on the device side and the vehicle side.

The priority calculating unit may calculate the priority on the basis of a degree of support from the equipment when the equipment information is received by the device-side receiver unit.

According to this configuration, the priority of the support using the support information is calculated on the basis of the degree of support which can be executed by the equipment of the vehicle. Accordingly, for example, the priority of the support using the support information can be calculated as low when the vehicle side can execute the detailed support or the priority of the support using the support information can be calculated as high when the vehicle side cannot execute the detailed support. As a result, it is possible to utilize the information acquired by the vehicle.

The priority calculating unit may calculate the priority of a support which cannot be executed by the equipment so as to be lower than other support priorities when the equipment information is received by the device-side receiver unit.

According to this configuration, the priority of the support which cannot be executed by the equipment of the vehicle is calculated as lower than other support priorities. Accordingly, the support information using the equipment of the vehicle can be more preferentially processed than the support information not using the equipment of the vehicle. As a result, it is possible to preferentially transmit the support information usable in the vehicle to the vehicle.

The device-side receiver unit may receive setting information representing whether the execution for the equipment is allowed as the equipment information, and the priority calculating unit may calculate the priority of the support from the equipment for which the execution is not allowed so as to be lower than other support priorities when the setting information is received by the device-side receiver unit.

According to this configuration, when the vehicle includes the equipment but the execution for the equipment of the vehicle is not allowed, the priority of the support from the equipment for which the execution is not allowed is calculated as lower than other support priorities. Accordingly, it is possible to preferentially transmit the support information of the support from the executable equipment to the vehicle.

The priority calculating unit may calculate the priority of the support using the support information overlapping with the detectable information so as to be lower than other support priorities when the detectable information is received by the device-side receiver unit.

According to this configuration, the priority of the support using the support information overlapping with the detectable information is calculated as lower than other support priorities. Accordingly, among the support information, the support information which cannot be acquired by the in-vehicle unit can be preferentially transmitted to the vehicle, compared with the support information overlapping with the information which can be acquired by the in-vehicle unit.

The device-side receiver unit may further receive driving characteristics of a driver of the vehicle, and the priority calculating unit may calculate the priority of the support on the basis of the driving characteristics of the driver when the driving characteristics of the driver are received by the device-side receiver unit.

According to this configuration, the priority of the support is calculated in consideration of the driving characteristic. Accordingly, it is possible to preferentially transmit the support information associated with the support necessary for the driver to the vehicle.

The device-side transmitter unit may transmit the support information in a state where a provision order of the support information associated with the support is set to be lower as the priority of support becomes lower, or may transmit the support information in a state where an information volume of the support information associated with the support is reduced to be smaller as the priority of the support becomes lower.

According to this configuration, as the priority of the support becomes lower, the support information is provided with a lower provision order. Alternatively, as the priority of the support becomes lower, the support information associated with the support is provided with a smaller amount of information. Accordingly, since the support information necessary for the vehicle can be efficiently provided, it is possible to reduce the amount of communication information or to reduce the system load.

According to another aspect of the invention, there is provided a vehicle information processing system including a vehicle and an information providing device, wherein the vehicle includes: a vehicle-side transmitter unit that transmits equipment information on equipment of the vehicle or detectable information detectable by an in-vehicle unit of the vehicle to the information providing device; and a vehicle-side receiver unit that receives support information from the information providing device, and wherein the information providing device includes: a device-side receiver unit that receives the equipment information or the detectable information; a priority calculating unit that calculates a priority of a support using the support information on the basis of the equipment information or the detectable information; and a device-side transmitter unit that transmits the support information to the vehicle on the basis of the calculated priority.

According to this aspect, the vehicle can transmit the equipment information on the equipment of the vehicle or the detectable information detectable by the in-vehicle unit, and the information providing device can calculate the priority of the support using the support information on the basis of the equipment information or the detectable information and transmit the support information to the vehicle on the basis of the calculated priority. Accordingly, since the priority of the support using the support information is calculated on the basis of the detectable information of the vehicle and the support information is transmitted to the vehicle on the basis of the calculated priority, the support information necessary for the vehicle is preferentially provided to the vehicle. As a result, it is possible to improve the efficiency of processes necessary for vehicle control, driving support, or the like in a device side and a vehicle side.

According to still another aspect of the invention, there is provided an in-vehicle information processing device that is mounted in a vehicle and that executes a first support on the basis of information acquired by equipment mounted in the vehicle and executes a second support on the basis of information acquired from an vehicle-external information source, the in-vehicle information processing device including: a priority calculating unit that calculates priorities of the first support and the second support on the basis of equipment information on the equipment and the information acquired from the vehicle-external information source; and a processing unit that performs a process associated with the first support or the second support on the basis of the priorities.

According to this aspect, the priority of the support is calculated by the priority calculating unit mounted in the vehicle on the basis of the information acquired from the equipment of the vehicle and the support information. Accordingly, for example, even when the support content to be executed using the information acquired from the vehicle overlap with the support content to be executed using the information acquired from the vehicle-external information source, the process of one support can be preferentially performed. As a result, since it is possible to avoid the simultaneous execution of the first support and the second support, it is possible to improve the efficiency of processes necessary for vehicle control, driving support, or the like.

Advantageous Effects of Invention

According to the aspects of the invention, it is possible to improve the efficiency of necessary processes for the vehicle control, the driving support, or the like.

REFERENCE SIGNS LIST

Figure 1:
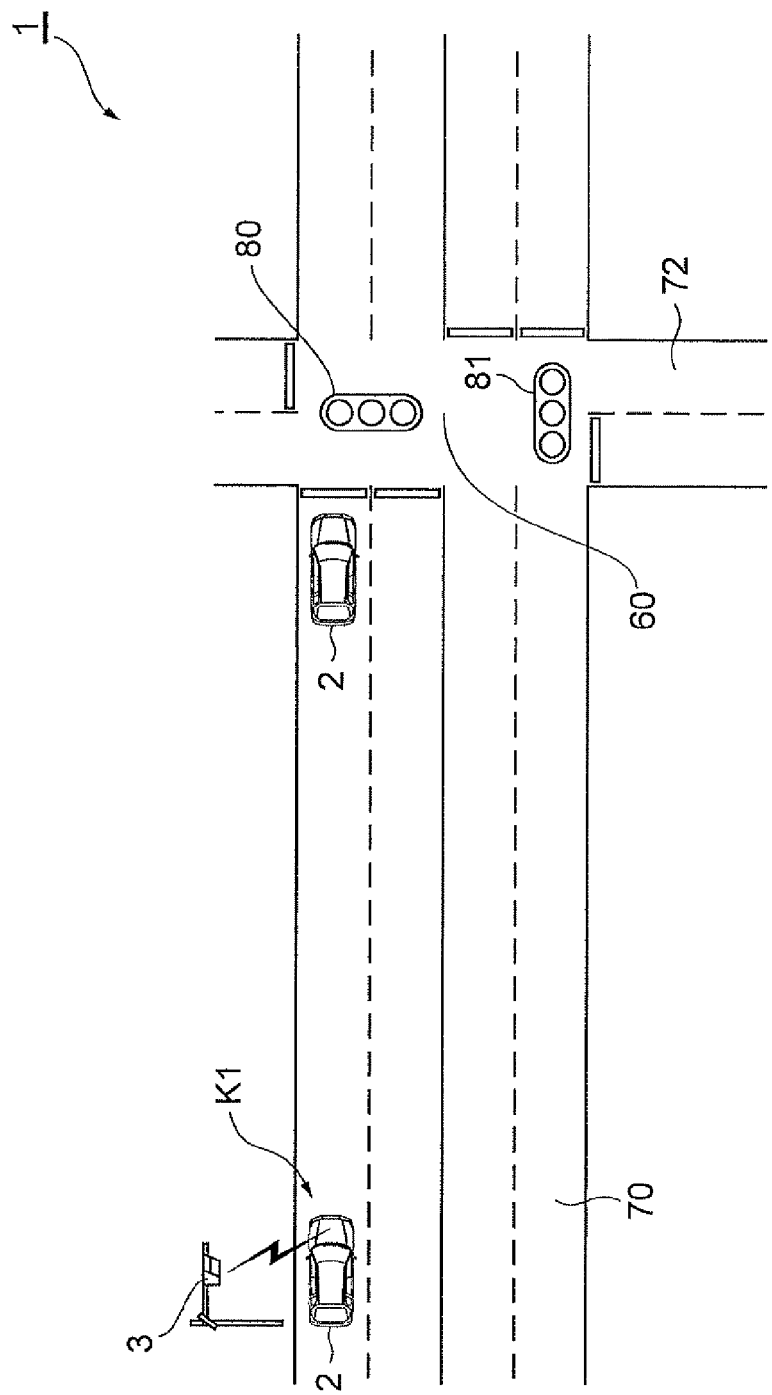
FIG. 1 is a diagram schematically illustrating the configuration of a vehicle information processing system according to first to third embodiments of the invention.

1: VEHICLE INFORMATION PROCESSING SYSTEM
2: VEHICLE
3: ROAD-SIDE SUPPORT DEVICE (INFORMATION PROVIDING DEVICE)
20: IN-VEHICLE INFORMATION PROCESSING DEVICE

21: SENSOR UNIT (IN-VEHICLE UNIT)
23: VEHICLE-SIDE TRANSMITTER UNIT
24: VEHICLE-SIDE RECEIVER UNIT
25: SUPPORT PROCESSING UNIT (VEHICLE EQUIPMENT)
26: EQUIPMENT INFORMATION
27: DETECTABLE INFORMATION
30: DEVICE-SIDE RECEIVER UNIT
31: PRIORITY CALCULATING UNIT
32: DEVICE-SIDE TRANSMITTER UNIT
33: SUPPORT INFORMATION

DESCRIPTION OF EMBODIMENTS

Hereinafter, embodiments of the invention will be described with reference to the accompanying drawings. In the drawings, like or similar elements are referenced by like reference signs and descriptions thereof will not be repeated.

First Embodiment

In a vehicle information processing system according to this embodiment of the invention is suitably employed to perform processes necessary for various services (various supports) such as vehicle control or driving support on the basis of information acquired from an in-vehicle unit or support information acquired from an vehicle-external information source (a road-side communication device or another vehicle).

A vehicle information processing system according to this embodiment will be first schematically described. FIG. 1 is a diagram schematically illustrating the configuration of a vehicle information processing system 1 according to this embodiment. FIG. 1 shows an example of a road in which a main road 70 and a secondary road 72 intersect each other at an intersection 60. A signal of the main road 70 is indicated by a signal 80 and a signal of the secondary road is indicated by a signal 81.

As shown in FIG. 1, the vehicle information processing system 1 includes a road-side support device (information providing device) 3. The road-side support device 3 is disposed over a road, on a side of the road, or around the road and uses, for example, an optical beacon. The road-side support device 3 has a function of detecting a vehicle 2 passing through the vicinity thereof and communicating with the vehicle 2. This road-to-vehicle communication is a so-called spot communication which is carried out only within a predetermined range (road-to-vehicle communication service section).

The road-side support device 3 is configured, for example, to receive signal information of peripheral signals, peripheral road information, peripheral obstruction information, or the like from a central management center performing a traffic control or another vehicle. The road-side support device 3 has a function of providing support information such as the signal information, the road information, or the obstruction information to the vehicle 2 through spot communication. For example, the road-side support device 3 serves to provide support information such as the road information of the main road 70, the obstruction information of the main road 70, and the signal information of the signal 80 located in the traveling direction of the vehicle 2 to the vehicle traveling through a location K1 on the main road 70 within the road-to-vehicle communication service section.

In this way, the vehicle information processing system 1 is configured to provide the support information to the vehicle 2 through spot communication within the road-to-vehicle communication service section of the road-side support device 3. The vehicle 2 has a function of acquiring information through the bidirectional communication with the road-side support device 3 and executing the vehicle control or the driving support on the basis of the acquired information at the time of passing through the road-to-vehicle communication service section. The vehicle 2 has a function of executing the vehicle control or the driving support on the basis of information acquired from an in-vehicle unit.

Figure 2:
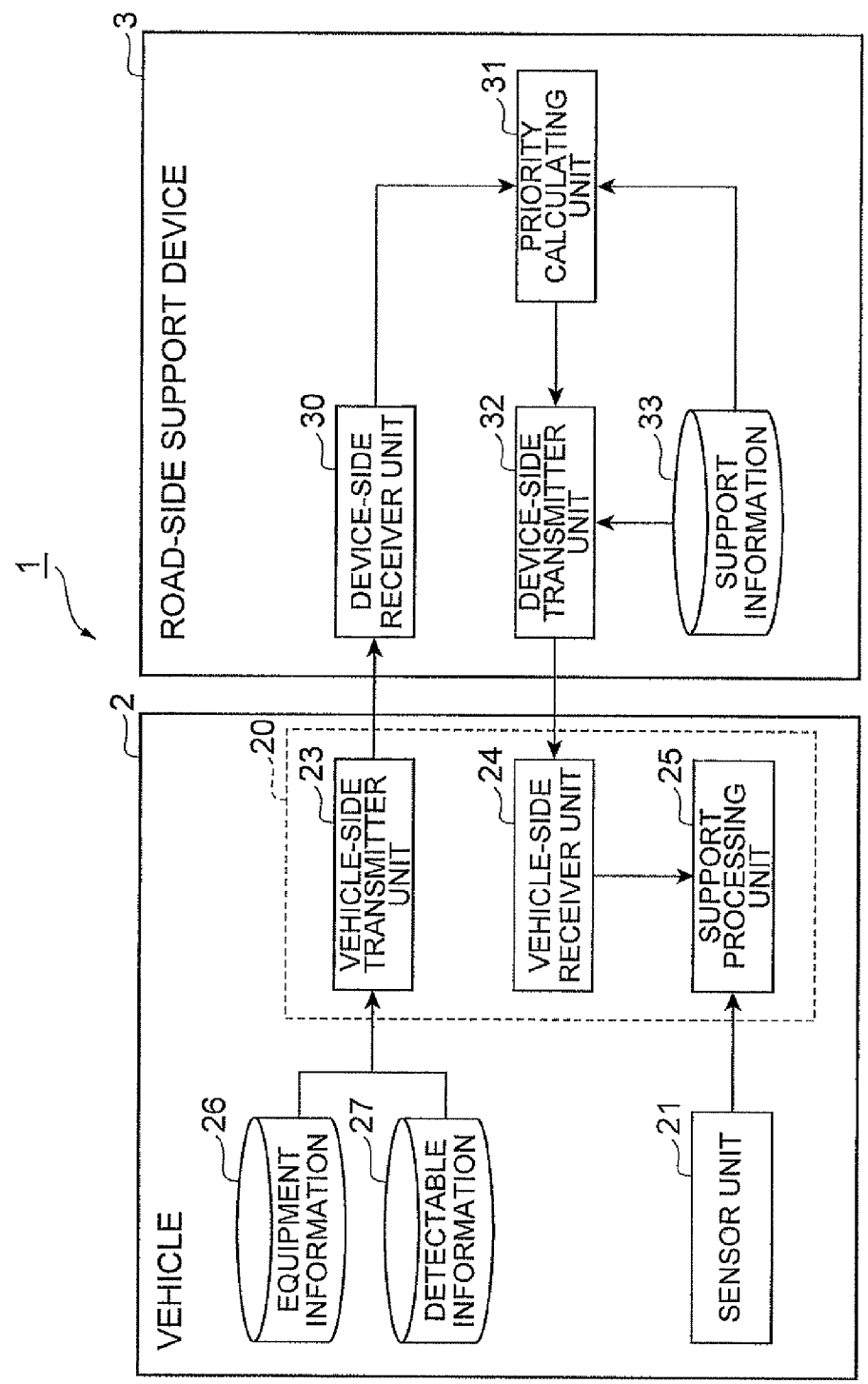
FIG. 2 is a block diagram schematically illustrating the configuration of the vehicle information processing system according to the first embodiment of the invention.

The detailed configuration of the vehicle information processing system 1 according to this embodiment will be described below. FIG. 2 is a block diagram illustrating the configuration of the vehicle information processing system 1 according to this embodiment. As shown in FIG. 2, the vehicle information processing system 1 includes the vehicle 2 and the road-side support device 3 configured to bidirectionally communicate with each other.

The detailed configuration of the vehicle 2 will be first described. The vehicle 2 includes a sensor unit 21 and an in-vehicle information processing device 20.

The sensor unit 21 is an in-vehicle unit of the vehicle 2 and has a function of acquiring traveling environment information around the vehicle 2, obstruction information around the vehicle 2, or vehicle state information of the vehicle 2. For example, the sensor unit 21 includes a lane recognition sensor or an image sensor used to recognize a driving lane of the vehicle 2, an electromagnetic sensor or a millimeter wave sensor detecting an obstruction around the vehicle 2 or a following vehicle and acquiring distance information, a yaw rate sensor measuring a yaw rate, a steering angle sensor detecting a steering wheel angle or a tire angle, an acceleration sensor detecting an acceleration, and a wheel speed sensor measuring a wheel speed. The sensor unit 21 has a function of outputting the acquired information to the in-vehicle information processing device 20.

The in-vehicle information processing device 20 includes, for example, a CPU (Central Processing Unit), a ROM (Read Only Memory), a RAM (Random Access Memory), and an input and output interface. The in-vehicle information processing device further includes a vehicle-side transmitter unit 23, a vehicle-side receiver unit 24, and a support processing unit 25.

The vehicle-side transmitter unit 23 has a function of transmitting information to the road-side support device 3. For example, the vehicle-side transmitter unit 23 has a function of outputting equipment information 26 of the vehicle 2 or detectable information 27 to the road-side support device 3. The equipment information 26 is information on equipment mounted in the vehicle 2 and details thereof will be described later. The detectable information 27 is information which can be acquired by the sensor unit 21 and is stored in advance, for example, in a memory of the vehicle 2.

The vehicle-side receiver unit 24 is configured to receive support information from the road-side support device 3. The support information is information used for processes associated with the vehicle control or the driving support and includes, for example, the signal information of a signal around the vehicle 2, the road information, and the obstruction information. The details of the support information will be described later. The vehicle-side receiver unit 24 has a function of outputting the received support information to the support processing unit 25.

The support processing unit 25 has a function of executing various services such as traveling control or traveling support of the vehicle 2 or driving support of a driver and is so-called in-vehicle equipment. The support processing unit 25 has two input paths of information necessary for executing various services. The first input path is a path through which the information output from an in-vehicle unit such as the sensor unit 21 is input. The second input path is a path through which the support information output from the vehicle-side receiver unit 24, that is, information received through the communication, is input. The support processing unit 25 is configured to execute various services on the basis of the information input through one or both of the first and second input paths.

Details of various services executed by the support processing unit 25 will be described below. For example, VDIM (Vehicle Dynamics Integrated Management), VSC (Vehicle Stability Control), ABS (Anti-lock Brake System), TRC (Traction Control), brake assist, and the like used as the vehicle control services. For example, guidance in a navigation system, ACC (Adaptive Cruise Control), LKA (Lane-Keeping Assist), night view, and the like are used as the driving support services. For example, PCS (Pre-Crash Security System) and the like are used as the traveling support or security services. The support processing unit 25 is configured to execute at least one of the services.

Details of the equipment information 26 will be described below. The equipment information 26 is information on equipment mounted in the vehicle 2 and is stored, for example, in the memory of the vehicle 2. The equipment information 26 is information on functions such as vehicle control, driving support, or security which can be executed by the support processing unit 25. For example, information representing whether the support processing unit 25 has functions such as VDIM, VSC, ABS, TRC, brake assist, navigation system, ACC, LKA, night view, and PCS is used as the equipment information 26. The equipment information 26 may include details of the equipment or details of the setting information. Information such as equipment name, support content, detailed functions, introduction date, version, support level, and support execution ability is also used as the equipment information 26. When the setting information which can be changed by a driver is included in the equipment information 26, the equipment information 26 is updated for each setting.

The detailed configuration of the road-side support device 3 will be described below. The road-side support device 3 has a function of providing support information 33 to the vehicle 2. The support information 33 is information necessary for executing various services such as the traveling control or traveling support of the vehicle 2 or the driving support of a driver. Information necessary for the vehicle 2 to execute at least one type of service is included in the support information 33. For example, the signal information of a signal around the vehicle 2, the road information, the obstruction information, or the like are used as the support information 33. Specifically, lighting cycle information of a signal, traffic information, road shape information, lane information, speed limit information, proceeding vehicle information, pedestrian information or the like are used. The road-side support device 3 includes a device-side receiver unit 30, a priority calculating unit 31, and a device-side transmitter unit 32.

The device-side receiver unit 30 is configured to receive the equipment information 26 or the detectable information 27 from the vehicle-side transmitter unit 23 of the vehicle 2. For example, an infrared receiving device is used as the device-side receiver unit 30. The device-side receiver unit 30 is configured to output the received equipment information 26 or the received detectable information 27 to the priority calculating unit 31.

The priority calculating unit 31 has a function of calculating priorities of services using the support information 33. The priority means a degree of preference by which a process associated with the corresponding service is performed. That is, the process associated with the service is performed on the basis of the magnitude of the priority. For example, when the processing order of services or the information volume to be processed is not changed, the priority is set to a predetermined value (for example, 1), a service with a priority higher than the predetermined value may be preferentially executed, and a service with a priority lower than the predetermined value may not be preferentially executed. The priority calculating unit 31 calculates the priority, for example, for each service using the support information 33. For example, when the support information 33 includes the signal information and the obstruction information, the priority calculating unit 31 calculates the priority of each service using the signal information or the obstruction information. The priority calculating unit 31 calculates the priorities of the services using the support information 33 on the basis of the equipment information 26 or the detectable information 27 of the vehicle 2. For example, the priority calculating unit 31 has a function of determining the types of services which can be executed by the vehicle 2 on the basis of the equipment information 26 and calculating the priorities of the services using the support information 33 on the basis of the types of services which can be executed by the vehicle 2 and the types of services using the support information 33. The priority calculating unit 31 has a function of determining the information which can be acquired by the sensor unit 21 of the vehicle 2 on the basis of the detectable information 27 and calculating the priorities of the services using the support information 33 on the basis of the information which can be acquired by the sensor unit 21 of the vehicle 2 and the support information 33. The priority calculating unit 31 has a function of outputting the calculated priorities to the device-side transmitter unit 32.

The device-side transmitter unit 32 has a function of transmitting the support information 33 to the vehicle 2. For example, an infrared emitting device is used as the device-side transmitter unit 32. When plural different types of information are included in the support information 33, the device-side transmitter unit 32 has a function of transmitting the support information 33 for each type on the basis of the priorities of the services calculated by the priority calculating unit 31. If plural different types of information are included in the support information 33, it means a case where the support information 33 associated with different services are grouped to form the support information 33. For example, the road shape information used for the brake assist and the pedestrian information used for the notification of information are included in the support information 33. The device-side transmitter unit 32 has a function of transmitting the support information 33 in a state where the priorities of services are correlated with the transmission order (provision order) or the information volumes to be transmitted. For example, when the priority of a predetermined service is lower than the priorities of other services, the device-side transmitter unit 32 has a function of setting the transmission order of the support information 33 associated with a predetermined service to be later than that of the support information 33 associated with other services and transmitting the support information to the vehicle 2. Alternatively, when the priority of a predetermined service is lower than the priorities of other services, the device-side transmitter unit 32 has a function of reducing the information volume of the support information 33 associated with the predetermined service and transmitting the support information to the vehicle 2.

Figure 3:
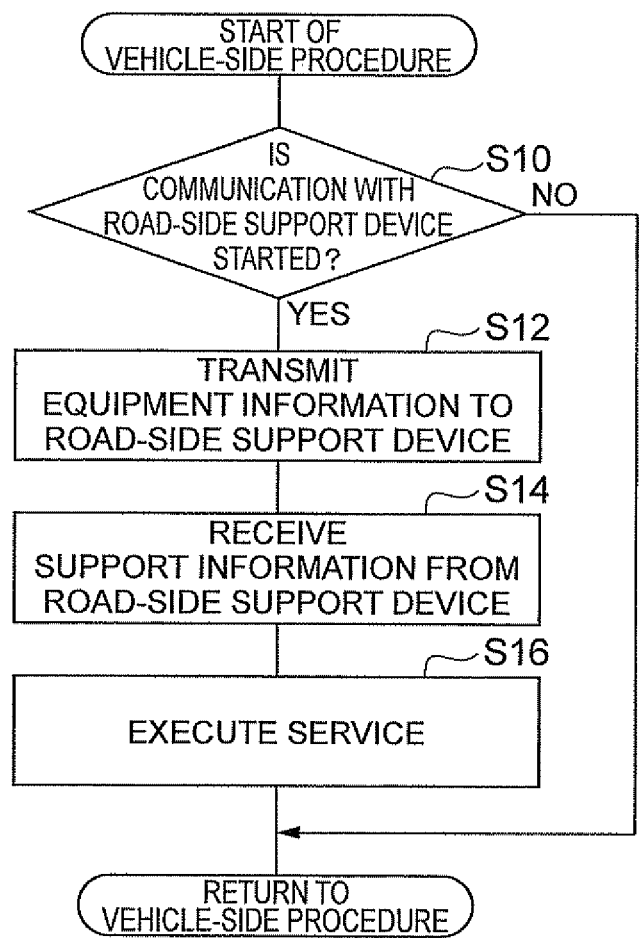
FIG. 3 is a flow diagram illustrating the behavior of an in-vehicle information processing device according to the first embodiment of the invention.

The behavior of the vehicle information processing system 1 according to this embodiment will be described. The behavior of the in-vehicle information processing device 20 will be first described. FIG. 3 is a flow diagram illustrating the behavior of the in-vehicle information processing device 20 according to this embodiment. The control procedure shown in FIG. 3 is repeatedly performed at a predetermined interval, for example, from the time when the ignition of the vehicle 2 is turned on. In consideration of ease of explanation and comprehension, FIG. 3 shows an example where the vehicle 2 transmits the equipment information 26 to the road-side support device 3.

As shown in FIG. 3, the in-vehicle information processing device 20 performs a communication determining process (S10). The process of S10 is performed, for example, by the vehicle-side receiver unit 24 and a process of determining whether a spot communication with the road-side support device 3 is started. For example, the vehicle-side receiver unit 24 determines whether information representing that the vehicle 2 is detected and the communication is started is received from the road-side support device 3. When it is determined in the process of step S10 that the communication with the road-side support device 3 is not started, the control procedure shown in FIG. 3 is ended. On the contrary, when it is determined in the process of step S10 that the communication with the road-side support device 3 is started, an equipment information transmitting process is performed (S12).

The process of S12 is performed by the vehicle-side transmitter unit 23 and is a process of transmitting the equipment information 26 to the road-side support device 3. The vehicle-side transmitter unit 23 transmits the equipment information 26 recorded in advance to the road-side support device 3. For example, it is assumed that the support processing unit 25 includes a navigation system. In this case, the vehicle-side transmitter unit 23 transmits to the road-side support device 3 the equipment information 26 such as "equipment name: Navigation System, support content: Information Support, detailed functions: Map Information Guiding Function and Stop Guiding Function, introduction date: YYMMDD, version: XX, support level: High, and support execution ability: Allowed". When the process of S12 is ended, a support information receiving process is performed (S14).

The process of S14 is performed by the vehicle-side receiver unit 24 and is a process of receiving the support information 33 from the road-side support device 3. Details of the support information 33 received in this process will be described later. When the process of S14 is ended, a support executing process is performed (S16).

The process of S16 is performed by the support processing unit 25 and is a process of executing various services such as vehicle control, driving support, and security on the basis of the support information 33 received in the process of S14. For example, when the pedestrian information is received in the process of S14, the support processing unit 25 executes the information provision on the basis of the received pedestrian information. When the process of S16 is ended, the control procedure shown in FIG. 3 is ended.

In this way, the control procedure shown in FIG. 3 is completed. When the vehicle 2 transmits the detectable information 27 to the road-side support device 3, the vehicle-side transmitter unit 23 can transmit the detectable information 27 in the process of S12. By performing the control procedure shown in FIG. 3, the vehicle 2 can receive the support information 33 from the road-side support device 3 and execute various services.

Figure 4:
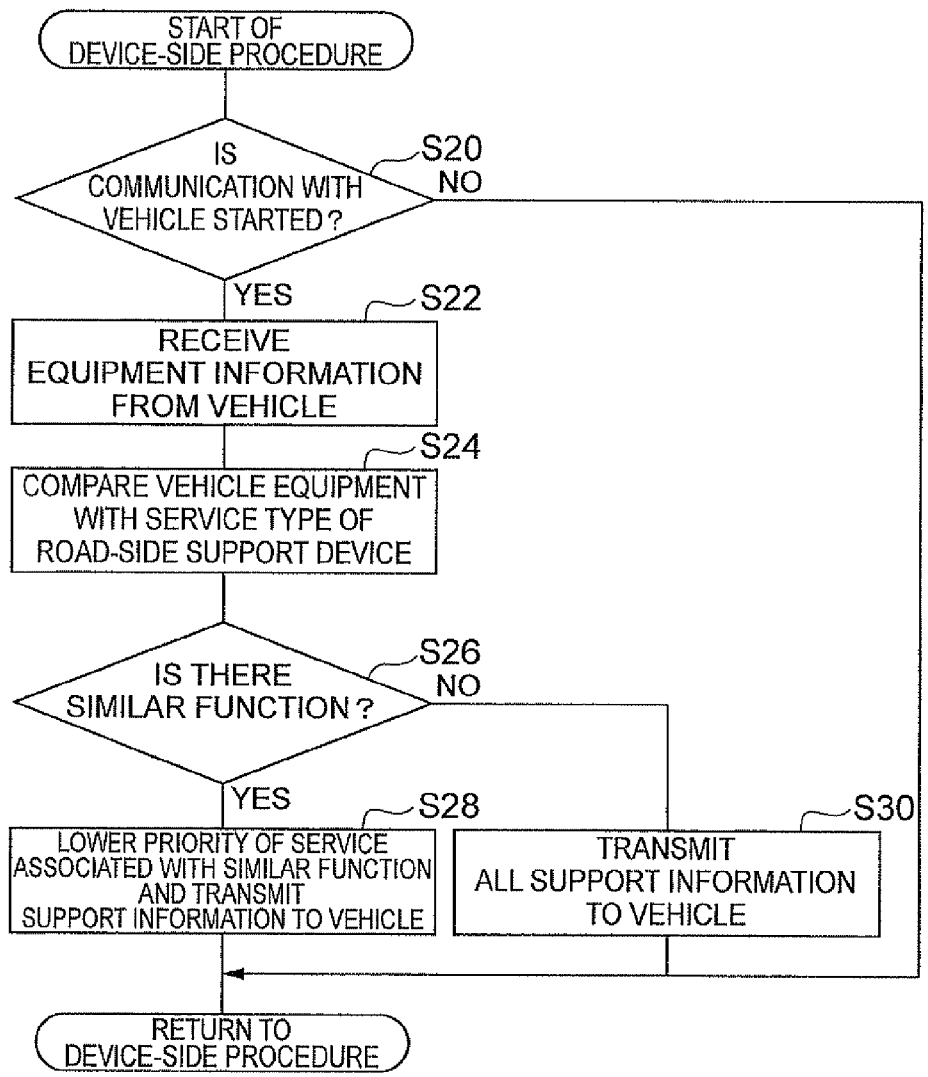
FIG. 4 is a flow diagram illustrating the behavior of an information providing device according to the first embodiment of the invention.

The behavior of the road-side support device 3 will be described below. FIG. 4 is a flow diagram illustrating the behavior of the road-side support device 3 according to this embodiment. The control procedure shown in FIG. 4 is repeatedly performed at a predetermined interval, for example, from the time when the road-side support device 3 is supplied with power. In consideration of ease of explanation and comprehension, FIG. 4 shows an example where the road-side support device 3 receives the equipment information 26 of the vehicle 2.

As shown in FIG. 4, the road-side support device 3 performs a communication determining process (S20). The process of S20 is performed by the road-side support device 3 and is a process of determining whether a spot communication with the vehicle 2 is started. For example, the road-side support device 3 emits infrared rays to a road through the use of the device-side transmitter unit 32 at predetermined intervals and detects whether the vehicle 2 passes by the location of the road-side support device 3. The road-side support device 3 notifies the vehicle 2 of the start of communication and determines that the communication with the vehicle 2 is started when the transmission is successful. When it is determined in the process of S20 that the communication with the vehicle 2 is not started, the control procedure shown in FIG. 4 is ended. On the contrary, when it is determined in the process of S20 that the communication with the vehicle 2 is started, a reception process is performed (S22).

The process of S22 is performed by the device-side receiver unit 30 and is a process of receiving the equipment information 26 from the vehicle 2. For example, it is assumed that the support processing unit 25 of the vehicle 2 includes a navigation system. In this case, the device-side receiver unit 30 receives from the vehicle-side transmitter unit 23 the equipment information 26 such as "equipment name: Navigation System, support content: Information Support, detailed functions: Map Information Guiding Function and Stop Guiding Function, introduction date: YYMMDD, version: XX, support level: High, and support execution ability: Allowed". When the process of S22 is ended, a type comparing process is performed (S24).

The process of S24 is performed by the priority calculating unit 31 and is a process of comparing the service provided from the road-side support device 3 with the service provided from the equipment of the vehicle on the basis of the support information 33 and the equipment information 26 received in the process of S22. For example, the priority calculating unit 31 determines the type of the service on the basis of the support information 33. For example, the priority calculating unit 31 includes a table storing types of services corresponding to the support information 33 and determines the type of the service using the support information 33 on the basis of the table. For example, when the support information 33 is the stop information, the priority calculating unit 31 determines that the type of the service is "provision of information" with reference to the table and determines that the details (detailed function) of the service is "notification of stop". The priority calculating unit 31 compares the type or details of the service provided by the support information 33 with the type or details of the service stored in the equipment information 26 and determines whether both services (or functions provided in the services) are similar to each other (S26). For example, when the result from one service is equal to or overlaps with the result from the other service, the priority calculating unit 31 determines that both services (or functions provided in the services) are similar to each other. In an example, it is assumed that the support information 33 is the stop information, a navigation system is mounted in the vehicle 2, and the navigation system has the stop guiding function. In this case, the priority calculating unit 31 determines that the functions provided in both services are similar to each other, since the service using the support information 33 is "notification of stop, vehicle control corresponding to stop, and the like" and the service provided from the equipment (navigation system) specified by the equipment information 26 is "stop guidance". In another example, it is assumed that the support information 33 is the obstruction information and a PCS is mounted in the vehicle 2. In this case, the priority calculating unit 31 determines that the functions of both services are similar to each other, since the service using the support information 33 is "notification of obstruction and vehicle control corresponding to collision" and the service provided from the equipment (PCS) specified by the equipment information 26 is "determination of unavoidable collision, occupant protection, and reduction of collision speed". In still another example, it is assumed that the support information 33 is the obstruction information, a navigation system is mounted in the vehicle 2, and the navigation system has the stop guiding function. In this case, the priority calculating unit 31 determines that the functions of both services are not similar to each other, since the service using the support information 33 is "notification of obstruction and vehicle control corresponding to collision" and the service provided from the equipment is "stop guidance". In this way, the priority calculating unit 31 compares the type or function of the service using the support information 33 with the equipment information 26 and determines whether there is a similar function. When it is determined in the process of S26 that the service using the support information 33 is similar to the service provided from the equipment specified by the equipment information 26, that is, when it is determined that both services have a similar function, a support information transmitting process is performed (S28).

The process of S28 is performed by the priority calculating unit 31 and the device-side transmitter unit 32 and is a process of transmitting the support information 33 to the vehicle 2. The priority calculating unit 31 calculates the priority of the service having the similar function to be lower than the priorities of other services on the basis of the determination result in S26. For example, it is assumed that the support information 33 includes the stop information and the navigation system of the vehicle 2 has the stop guiding function. In this case, the priority calculating unit 31 calculates the priority of the service using the stop information as the support information 33 to be lower than the priorities of other services. The device-side transmitter unit 32 transmits the support information 33 to the vehicle 2 on the basis of the calculated priority. For example, the device-side transmitter unit 32 does not transmit the support information 33 used for the service associated with the similar function but transmits the support information 33 other than the corresponding support information 33 to the vehicle 2. Alternatively, the transmission order of the support information 33 used in the service associated with the similar function is set to be later than the transmission order of the other support information 33 or the information volume thereof is reduced, and then the support information is transmitted to the vehicle 2. That is, the device-side transmitter unit 32 preferentially transmits the support information 33 other than the stop information among the support information 33. When the process of S28 is ended, the control procedure shown in FIG. 4 is ended.

On the other hand, when it is determined in the process of S26 that the function of the service using the support information 33 is not similar to the function of the service based on the equipment specified by the equipment information 26, an information transmitting process is performed (S30). The process of S30 is performed by the device-side transmitter unit 32 and is a process of transmitting all the support information 33 to the vehicle 2. When the process of S30 is ended, the control procedure shown in FIG. 4 is ended.

In this way, the control procedure shown in FIG. 4 is completed. When the road-side support device 3 receives the detectable information 27, the priority calculating unit 31 compares the detectable information 27 with the support information 33 which can be provided and determines whether the functions of both services are similar to each other, in the processes of S24 and S26. When the details of the support overlap with each other, the priority calculating unit can calculate the priority of the service using the support information 33 overlapping with the detectable information 27 to be lower than the priorities of other services.

By performing the control procedure shown in FIG. 4, the road-side support device 3 receives the equipment information 26 from the vehicle 2, determines the type of the service unnecessary for the vehicle 2 on the basis of the received equipment information 26, and preferentially transmits the support information 33 associated with the type of the service necessary for the vehicle 2 to the vehicle 2. Alternatively, the road-side support device 3 receives the detectable information 27 from the vehicle 2 and preferentially transmits the support information 33 not overlapping with the detectable information 27 to the vehicle 2. Accordingly, since the amount of data transmitted to the vehicle 2 can be reduced, it is possible to improve the transmission rate or the communication rate. The amount of data received by the vehicle 2 has an influence on the reception time. By performing the control procedure shown in FIG. 4, the support information 33 to be transmitted can be limited to the services or information necessary for the vehicle 2. Accordingly, it is possible to reduce the load on the reception process of the vehicle 2 and thus to rapidly provide a service.

As described above, in the vehicle information processing system 1 according to the first embodiment, the vehicle 2 can transmit the equipment information 26 on the support processing unit 25 or the detectable information 27 detectable by the sensor unit 21 of the vehicle 2 to the road-side support device 3, and the road-side support device 3 can calculate the priority of the service using the support information 33 on the basis of the equipment information 26 or the detectable information 27 and transmit the support information 33 to the vehicle 2 on the basis of the calculated priority. Accordingly, since the priority of the service using the support information 33 is calculated on the basis of the information which can be acquired by the vehicle 2 and the support information 33 is transmitted to the vehicle 2 on the basis of the calculated priority, the support information 33 associated with the service necessary for the vehicle 2 is preferentially provided to the vehicle 2. As a result, it is possible to improve the efficiency of processes necessary for vehicle control, driving support, or the like in the road-side support device 3 and the vehicle 2.

The road-side support device 3 according to the first embodiment can receive the equipment information 26 on the equipment mounted in the vehicle 2 or the detectable information 27 detectable by the sensor unit 21 of the vehicle 2 and calculate the priority of the service using the support information 33 on the basis of the equipment information 26 or the detectable information 27. Accordingly, the priority of the servicing using the support information 33 is calculated on the basis of the information which can be acquired by the vehicle 2. Since the support information 33 is transmitted to the vehicle 2 on the basis of the calculated priority, the support information 33 associated with the service necessary for the vehicle 2 is preferentially provided to the vehicle 2. As a result, it is possible to improve the efficiency of processes necessary for vehicle control, driving support, or the like in the road-side support device 3 and the vehicle 2.

When the device-side receiver unit 30 receives the detectable information 27, the road-side support device 3 according to the first embodiment can calculate the priority of the service using the support information 33 overlapping with the detectable information 27 to be lower than the priorities of other services. Accordingly, it is possible to preferentially transmit the support information 33 which cannot be acquired by the sensor unit 21 to the vehicle, compared with the support information 33 overlapping with the information which can be acquired by the sensor unit 21.

In the road-side support device 3 according to the first embodiment, the device side transmitter unit 32 can transmit the support information 33 associated with a service lower in the transmission order to the extent that the priority of the service is lowered, or can transmit the support information 33 associated with the service with an information volume to the extent that the priority of the service is lowered. Accordingly, the support information 33 associated with a service with a low priority, that is, the support information unnecessary for the vehicle, is transmitted lower in the provision order or is transmitted with a smaller information volume. Therefore, since the support information 33 necessary for the vehicle 2 can be efficiently provided, it is possible to reduce the amount of communication between the road-side support device 3 and the vehicle 2 or to reduce the total system load.

Second Embodiment

A vehicle information processing system 1 according to a second embodiment has almost the same configuration as the vehicle information processing system 1 according to the first embodiment, but is different from the vehicle information processing system 1 according to the first embodiment, in some functions of the priority calculating unit 31 in the road-side support device 3. In the second embodiment, the same elements as in the first embodiment will not be described and the differences therebetween will be described.

A vehicle 2 according to the second embodiment has almost the same configuration as the vehicle 2 according to the first embodiment and is configured such that a driver can set the ON/OFF states of the functions of the equipment or the support levels. The road-side support device 3 according to the second embodiment has almost the same configuration as the road-side support device 3 according to the first embodiment, but is different from the road-side support device 3 according to the first embodiment in the priority calculating method in the priority calculating unit 31. For example, when the device-side receiver unit 30 receives the equipment information 26, the priority calculating unit 31 has a function of calculating a priority of a service on the basis of a degree of service from the equipment of the vehicle 2. That is, when the service provided from the equipment of the vehicle 2 is similar to the service using the support information 33, the priority calculating unit 31 according to the first embodiment has a function of calculating the priority of the service using the support information 33 to be lower than the priorities of other services. However, even when the service provided from the equipment of the vehicle 2 is similar to the service using the support information 33 (for example, the services have the same type of details), the priority calculating unit 31 according to the second embodiment has a function of calculating the priority on the basis of the degree of service. Here, the degree of service means a service level determined depending on the support content of the equipment. For example, even when the same information is equipped, the service level varies depending on the precision of data as a reference source or the like. For example, when a navigation system is mounted, the service level becomes higher as the precision of map information becomes higher. When the functions of the equipment are set by a driver, the degree of service varies according to the driver's setting. For example, when a notification level of map information or the like is set by the driver, the service level varies according to the driver's setting. For example, when the service provided from the equipment of the vehicle 2 and the service using the support information 33 have the same type of service details, the priority calculating unit 31 has a function of checking the service level from the equipment on the basis of the equipment information 26. When the service level provided from the equipment is higher than a predetermined value, the priority calculating unit 31 has a function of setting the priority of the service using the support information 33 to be lower than the priorities of other services. The predetermined value may be set in advance depending on the degree of service using the support information 33. In the state where the predetermined value is set as described above, the priority calculating unit 31 has a function of setting the priority of the service using the support information 33 to be lower than the priorities of the other support information 33 when the service level provided from the equipment is higher than the service level using the support information 33, and setting the priority of the service using the support information 33 when the service level provided from the equipment is lower than the service level using the support information 33. The other functions are the same as those of the priority calculating unit 31 according to the first embodiment.

Figure 5:
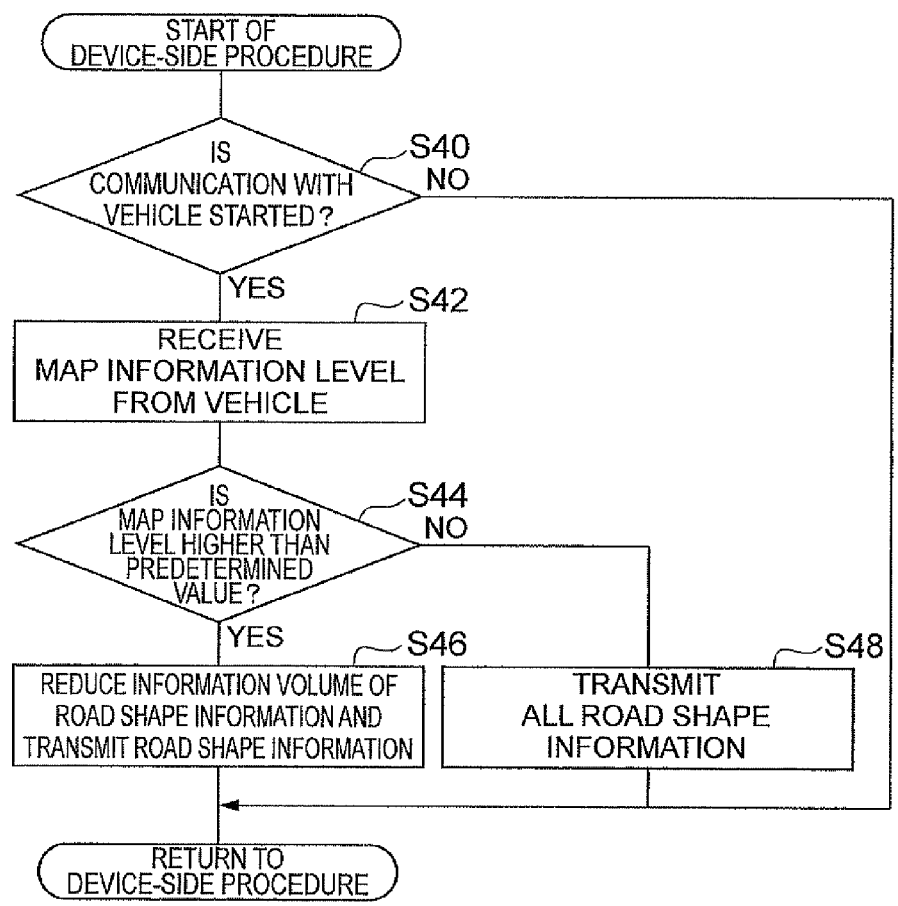
FIG. 5 is a flow diagram illustrating the behavior of an information providing device according to the second embodiment of the invention.
Figure 6:
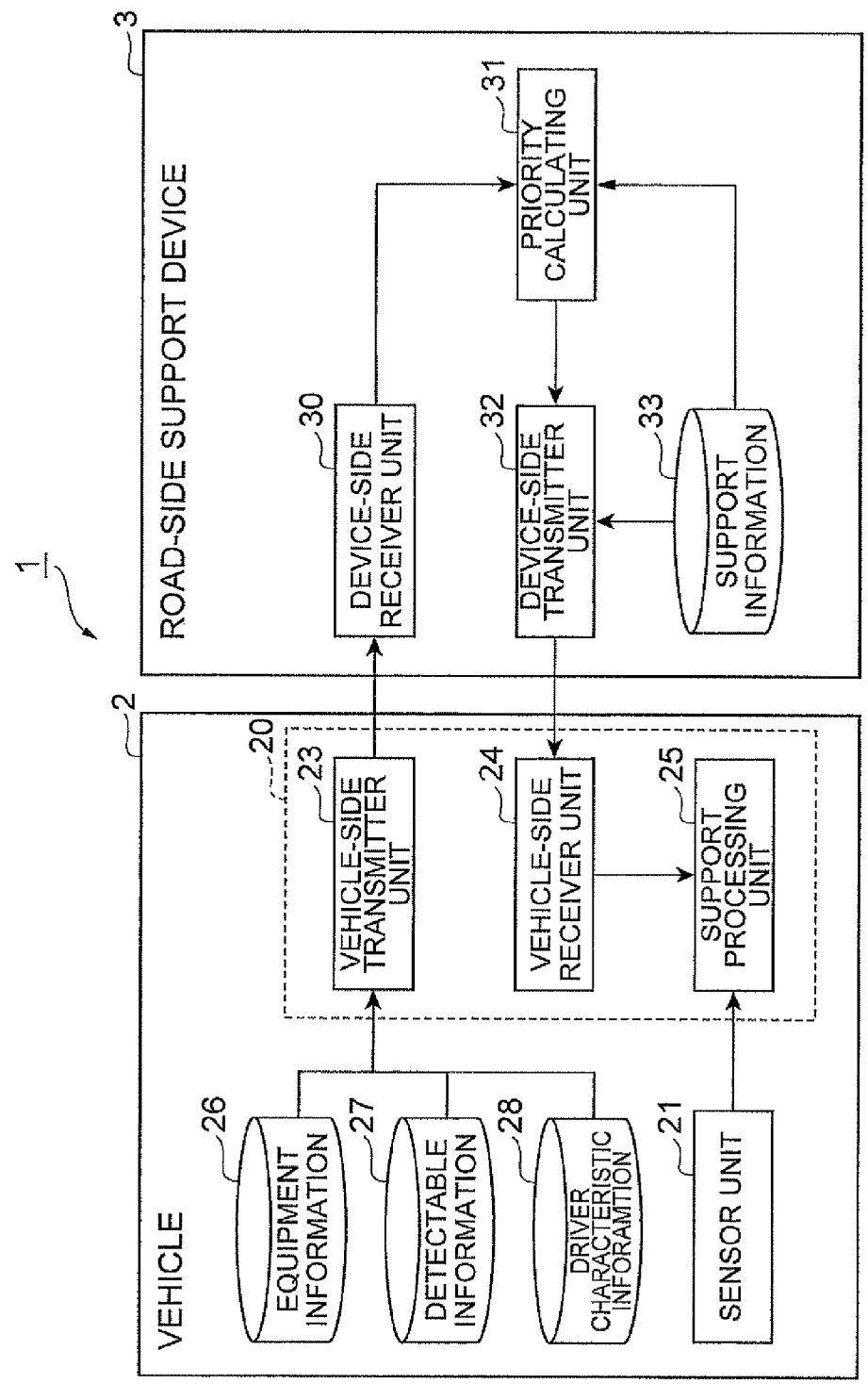
FIG. 6 is a block diagram schematically illustrating the configuration of the vehicle information processing system according to the third embodiment of the invention.

The behavior of the vehicle information processing system 1 according to this embodiment will be described below. The behavior of the vehicle 2 is the same as the control procedure shown in FIG. 3 and thus will not be repeated, but the behavior of the road-side support device 3 according to this embodiment will be described. FIG. 5 is a flow diagram illustrating the behavior of the road-side support device 3 according to this embodiment. The control procedure shown in FIG. 5 is repeatedly performed at a predetermined interval, for example, from the time when the power source of the road-side support device 3 is turned on. In consideration of the ease of explanation and comprehension, FIG. 5 shows an example where the vehicle 2 includes a navigation system as the equipment. It is also assumed that the support information 33 which can be provided from the road-side support device 3 includes road shape information.

As shown in FIG. 5, the road-side support device 3 performs a communication determining process (S40). The process of S40 is the same as the process of S20 shown in FIG. 4 and is a process of determining whether the spot communication with the vehicle 2 is started. When it is determined in the process of S40 that the communication with the vehicle 2 is not started, the control procedure shown in FIG. 5 is ended. On the contrary, when it is determined in the process of S40 that the communication with the vehicle 2 is started, a reception process is performed (S42).

The process of S42 is the same as the process of S22 shown in FIG. 4 and is a process of receiving the equipment information 26 from the vehicle 2. Here, a map information level is acquired as the equipment information 26 of the navigation system, in addition to equipment name, support content, detailed function, introduction date, version, support level, and support execution ability. The map information level is a value determined depending on the grade of navigation, the amount of map data, the history update date and time of navigation, the distance from home, and the traveling history count. For example, as the grade of navigation, the amount of map data, the traveling history count, and the like become greater or as the distance from home or the time passing from the update date and time becomes smaller, the map information level becomes higher. As the map information level of the map information used in the service becomes higher, the service level becomes higher. That is, it is possible to determine the service level using the map information level. When the process of S42 is ended, a map level determining process is performed (S44).

The process of S44 is performed by the priority calculating unit 31 and is a process of determining the map information level acquired in the process of S42. For example, the priority calculating unit 31 determines whether the map information level of the equipment is higher than a predetermined value. The predetermined value is set, for example, on the basis of the precision of the road shape information as the support information 33. When it is determined in the process of S44 that the map information level is higher than the predetermined value, a transmission process is performed (S46).

The process of S46 is performed by the priority calculating unit 31 and the device-side transmitter unit 32 and is a process of transmitting the support information 33 to the vehicle 2. The priority calculating unit 31 calculates the priority of a service using the road shape information among the support information 33 to be lower than the priorities of the services using the other support information 33. The device-side transmitter unit 32 transmits the support information 33 on the basis of the calculated priority. That is, the device-side transmitter unit 32 preferentially transmits the support information 33 other than the road shape information among the support information 33. For example, the device-side transmitter unit 32 reduces the information volume of the road shape information and transmits the support information 33 to the vehicle 2. For example, the device-side transmitter unit 32 does not transmit all the road shape information for each of the roads but only transmits the road shape information of an intersection. The device-side transmitter unit may not transmit the road shape information but may transmit other support information 33 to the vehicle 2, or may transmit the support information 33 to the vehicle 2 lower in the transmission order of the road shape information than that of the other support information 33. When the process of S46 is ended, the control procedure shown in FIG. 5 is ended.

On the other hand, when it is determined in the process of S44 that the map information level is not higher than the predetermined value, the transmission process is performed (S46). The process of S46 is performed by the device-side transmitter unit 32 and is a process of transmitting all the support information 33 to the vehicle 2. When the process of S46 is ended, the control procedure shown in FIG. 5 is ended.

In this way, the control procedure shown in FIG. 5 is completed. By performing the control procedure shown in FIG. 5, the road-side support device 3 receives the equipment information 26 from the vehicle 2, determines whether the map information level of the received equipment information 26 is higher than a predetermined value, and transmits the road shape information to the vehicle 2 with a smaller information volume when the map information level is higher than the predetermined value. Accordingly, since the amount of data to be transmitted to the vehicle 2 can be reduced, it is possible to enhance the transmission rate or the communication rate. The amount of data received by the vehicle 2 has an influence on the reception time. By performing the control procedure shown in FIG. 5, it is possible to reduce the information volume of the road shape information when the map information level is higher than the predetermined value. Accordingly, it is possible to reduce the load on the reception process in the vehicle 2 and thus to rapidly provide a service.

As described above, the road-side support device 3 according to the second embodiment can calculate the priority of the service using the support information 33 on the basis of the degree of service provided from the equipment of the vehicle 2. Accordingly, even when the service using the support information 33 has the same type as the service which can be executed by the equipment of the vehicle 2, the priority of the service using the support information 33 is calculated on the basis of the degree of service which can be executed by the equipment. That is, it is possible to calculate the priority of the service using the support information 33 to be low when the vehicle 2 can execute detailed services, or it is possible to calculate the priority of the service using the support information 33 to be high when the vehicle 2 cannot execute the detailed services. Accordingly, it is possible to preferentially process the information with a high use value. That is, it is possible to effectively utilize the information which can be used by the vehicle 2.

Third Embodiment

A vehicle information processing system 1 according to a third embodiment has almost the same configuration as the vehicle information processing system 1 according to the first embodiment, but is different from the vehicle information processing system 1 according to the first embodiment, in some functions of the priority calculating unit 31 in the road-side support device 3. In the third embodiment, the same elements as in the first and second embodiments will not be described and the differences therebetween will be described.

A vehicle 2 according to the third embodiment has almost the same configuration as the vehicle 2 according to the first embodiment, but is different therefrom, in that driver characteristic information 28 is used. The driver characteristic information 28 is driving characteristics of a driver. For example, information on past driving performance such as traveling route, information on acceleration and deceleration, and right and left turn time is used as the driver characteristic information 28. The vehicle-side transmitter unit 23 of the vehicle 2 has a function of transmitting the driver characteristic information 28 to the road-side support device 3. The remaining configuration of the vehicle 2 is the same as the configuration of the vehicle 2 according to the first embodiment.

A road-side support device 3 according to the third embodiment has almost the same configuration as the road-side support device 3 according to the first embodiment, but is different from the road-side support device 3 according to the first embodiment, in that the information received by the device-side receiver unit 30 and the priority calculating method in the priority calculating unit 31. For example, the device-side receiver unit 30 has a function of receiving one of the equipment information 26, the detectable information 27, and the driver characteristic information 28 from the vehicle 2. For example, when the equipment information 26 is input from the device-side receiver unit 30, the priority calculating unit 31 has a function of calculating the priority of a service, which cannot be executed by the equipment of the vehicle 2, to be lower than the priorities of the other services. The priority calculating unit 31 has a function of setting the priority of a service using the support information 33 to be lower than a predetermined value, for example, when the equipment information 26 is input from the device-side receiver unit 30 and the service which can be executed by the equipment of the vehicle 2 is only the provision of information. The predetermined value can be set to 1, for example, when a normal amount of data is to be transmitted. The priority calculating unit 31 has a function of calculating the priority of a service provided from the equipment for which the execution is not allowed to be lower than the priorities of the other services, for example when the equipment information 26 is input from the device-side receiver unit 30. The priority calculating unit has a function of calculating the priority of the service from the equipment to be lower than the priorities of the other services, for example, when the function of the equipment is turned off by the driver. The priority calculating unit 31 also has a function of calculating the priority of the service on the basis of the driver characteristic information 28, for example, when the driver characteristic information 28 is input from the device-side receiver unit 30. The remaining configuration is the same as the configuration of the priority calculating unit 31 according to the first embodiment.

Figure 7:
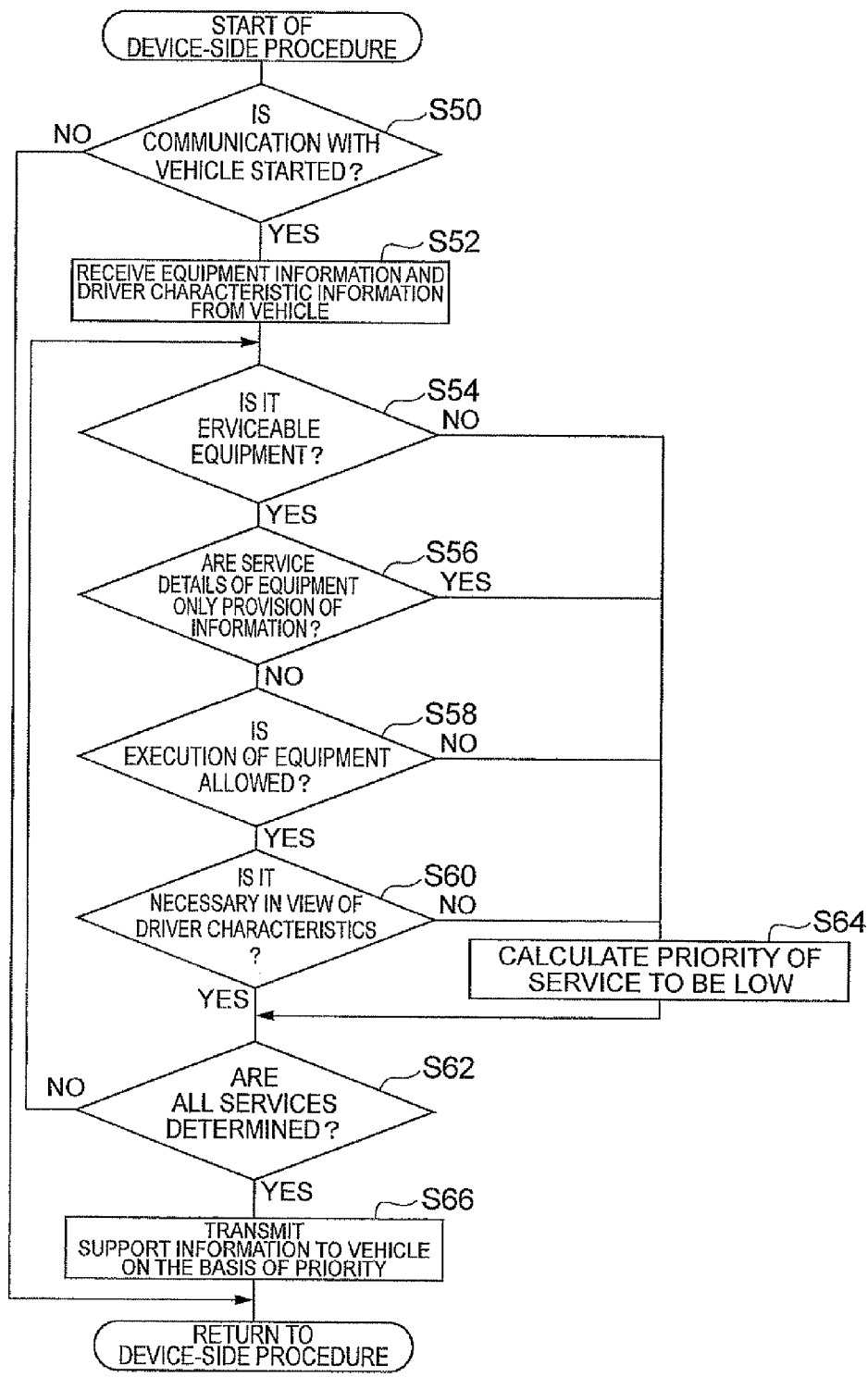
FIG. 7 is a flow diagram illustrating the behavior of an in-vehicle information processing device according to the third embodiment of the invention.

The behavior of the vehicle information processing system 1 according to this embodiment will be described below. The behavior of the vehicle 2 is almost the same as the control procedure shown in FIG. 3, but is different therefrom, in that the driver characteristic information 28 is transmitted in the process of S12. Accordingly, the behavior of the vehicle will not be described and the behavior of the road-side support device 3' according to this embodiment will be described. FIG. 7 is a flow diagram illustrating the behavior of the road-side support device 3 according to this embodiment. The control procedure shown in FIG. 7 is repeatedly performed at a predetermined interval, for example, from the time when the power source of the road-side support device 3 is turned on. In consideration of ease of explanation and comprehension, it is assumed that all the services using the support information 33 are set in advance to a reference priority 1.

As shown in FIG. 7, the road-side support device 3 performs a communication determining process (S50). The process of S50 is the same as the process of S20 shown in FIG. 4 and is a process of determining whether the spot communication with the vehicle 2 is started. When it is determined in the process of S50 that the communication with the vehicle 2 is not started, the control procedure shown in FIG. 7 is ended. On the contrary, when it is determined in the process of S50 that the communication with the vehicle 2 is started, a reception process is performed (S52).

The process of S52 is the same as the process of S22 shown in FIG. 4 and is a process of receiving the equipment information 26 and the driver characteristic information 28 from the vehicle 2. The device-side receiver unit 30 receives as the equipment information 26 equipment name, support content, detailed function, introduction date, version, support level, support execution ability, and the like. The device-side receiver unit 30 receives as the driver characteristic information 28 information on past driving performance such as traveling route, information on acceleration and deceleration, and right and left turn times. When the process of S52 is ended, an equipment determining process is performed (S54).

The process of S54 is performed by the priority calculating unit 31 and is a process of determining whether the vehicle 2 includes serviceable equipment using the support information 33 as an input. The priority calculating unit 31 determines whether the vehicle 2 includes equipment using the support information 33 as an input, for example, on the basis of the equipment information 26 acquired in the process of S52. This determination may be performed, for example, using a table storing equipment corresponding to the support information 33, or may be performed on the basis of the equipment information 26 where information of data which can be input to the equipment is stored in advance in the equipment information 26. When it is determined in the process of S54 that the vehicle 2 includes the equipment using the support information 33 as an input, a support detail determining process is performed (S56).

The process of S56 is performed by the priority calculating unit 31 and is a process of determining whether the service provided from the equipment of the vehicle 2 is only the provision of information on the basis of the equipment information 26. For example, the priority calculating unit 31 determines whether the service is only the provision of information with reference to an item associated with the equipment name or the detailed function among the equipment information 26 received in the process of S52. When it is determined in the process of S56 that the service provided from the equipment of the vehicle 2 is not the provision of information, an execution allowable determining process is performed (S58).

The process of S58 is performed by the priority calculating unit 31 and is a process of determining whether the execution for the equipment of the vehicle 2 is allowed on the basis of the equipment information 26. For example, the priority calculating unit 31 determines whether equipment for which the support execution is allowed to a driver exists in the equipment using the support information 33 as an input with reference to an item associated with the support execution in the equipment information 26 received in the process of S52. For example, information on the ON/OFF states of the equipment is recorded as the support execution. When it is determined in the process of S58 that the execution for the equipment of the vehicle 2 is allowed, for example, when the equipment of the vehicle 2 is in the ON state, a support information determining process is performed (S60).

The process of S60 is performed by the priority calculating unit 31 and is a process of determining whether the service using the support information 33 is necessary for the driver of the vehicle 2 on the basis of the driver characteristic information 28. For example, when it is determined on the basis of the driver characteristic information 28 that the driver of the vehicle 2 is a driver who quickly accelerates or decelerates in the vicinity of a signal, the priority calculating unit 31 determines that the service using the signal information of the support information 33 as an input is a service necessary for the driver. For example, when it is determined on the basis of the driver characteristic information 28 and the traveling history of the vehicle 2 that the driver is familiar with the road, the priority calculating unit 31 determines that the information on the service of cognitive error, for example, the service using static information, is a service unnecessary for the driver. When it is determined in the process of S60 that the service using the support information 33 is necessary for the driver of the vehicle 2, an end determining process is performed (S62).

On the other hand, when it is determined in the process of S54 that the equipment using the support information 33 as an input does not have the vehicle 2, a priority calculating process is performed (S64). When it is determined in the process of S56 that the support content of the equipment of the vehicle 2 is for only the provision of information, the priority calculating process is performed (S64). When it is determined in the process of S58 that the execution for the equipment of the vehicle 2 is not allowed, the priority calculating process is performed (S64). When it is determined in the process of S60 that the support information 33 is unnecessary for the driver of the vehicle 2, the priority calculating process is performed (S64).

The process of S64 is performed by the priority calculating unit 31 and is a process of calculating the priority of the service using predetermined support information 33 to be lower than the priorities of the other services. For example, when the vehicle 2 does not include equipment using the support information 33 as an input, the priority calculating unit 31 calculates the priority of the service using the corresponding support information 33 to be lower than the priorities of the other services. For example, when the support content of the equipment of the vehicle 2 are only the provision of information, the priority calculating unit 31 calculates the priority of the service using the support information 33 to be lower than the reference priority 1. For example, when the execution for the equipment of the vehicle 2 is not allowed, the priority calculating unit 31 calculates the priority of the service using the support information 33 to be lower than the priorities of the other services. For example, when it is determined that the service using the support information 33 is unnecessary for the driver of the vehicle 2, the priority calculating unit 31 calculates the priority of the service using the corresponding support information 33 to be lower than the priorities of the services using the other support information 33. When the process of S64 is ended, the end determining process is performed (S62).

The process of S62 is performed by the priority calculating unit 31 and is a process of determining whether all the support information 33 has been subjected to the determination processes of S54 to S60. When it is determined in the process of S62 that all the services using the support information 33 have been subjected to the determination processes, the equipment determining process is performed again (S54). Accordingly, the determination processes of S54 to S60 are repeatedly performed until the determination processes of S54 to S60 are performed on all the services.

On the other hand, when it is determined in the process of S62 that the determination processes are performed on all the services using the support information 33, a transmission process is performed (S66). The process of S66 is performed by the device-side transmitter unit 32 and is a process of transmitting the support information 33 on the basis of the priority of the service. For example, the device-side transmitter unit 32 transmits the support information 33 associated with a service of which the priority is lower than 1 lower in the transmission order or with a smaller amount of data to be transmitted. When the process of S66 is ended, the control procedure shown in FIG. 7 is ended.

In this way, the control procedure shown in FIG. 7 is completed. By performing the control procedure shown in FIG. 7, the priorities of the support information 33 not input to the equipment of the vehicle 2, the support information 33 input to the equipment for which the execution is not allowed, and the support information 33 unnecessary for the driver are set to be lower. Accordingly, other support information 33 is more preferentially transmitted than such support information 33. The detailed support information 33 is considered as being unnecessary for the vehicle 2 performing only the provision of information and a smaller amount of data is transmitted thereto. For example, only the information on the intersection in the road shape information is considered as being transmitted. Accordingly, since it is possible to reduce the amount of data to be transmitted to the vehicle 2, it is possible to enhance the transmission rate or the communication rate. Since the support information 33 to be transmitted can be limited to information which can be utilized or which is necessary for the driver, it is possible to reduce the load on the reception process of the vehicle 2 and thus to rapidly provide services.

As described above, in the road-side support device 3 according to the third embodiment, the priority calculating unit 31 can calculate the priority of the service which cannot be executed by the equipment to be lower than the priorities of the other services when the equipment information 26 is received by the device-side receiver unit 30. Accordingly, the priority of the service which can be executed by the equipment of the vehicle is calculated to be lower than those of the other services. As a result, it is possible to preferentially transmit the support information 33 associated with the service, which can be used by the vehicle 2, to the vehicle.

In the road-side support device 3 according to the third embodiment, the device-side receiver unit 30 can receive the setting information representing whether the execution for the equipment is allowed as the equipment information 26, and the priority calculating unit 31 can calculate the priority of the service from the equipment for which the execution is not allowed so as to be lower than the priorities of the other services when the setting information is received by the device-side receiver unit 30. Accordingly, when the vehicle includes the equipment but the execution for the equipment is not allowed, the priority of the service from the equipment for which the execution is not allowed is calculated to be lower than the priorities of the other services. As a result, it is possible to preferentially transmit the support information 33 associated with the service from the equipment, of which the execution is not allowed, to the vehicle 2.

In the road-side support device 3 according to the third embodiment, the device-side receiver unit 30 can receive the driver characteristic information 28 and can calculate the priority of the service on the basis of the received driver characteristic information 28. Accordingly, the priority is calculated in consideration of the driver characteristic information 28. As a result, it is possible to preferentially transmit the support information 33 associated with the service necessary for the driver to the vehicle 2.

Fourth Embodiment

A vehicle information processing system 1 according to a fourth embodiment has almost the same configuration as the vehicle information processing system 1 according to the first embodiment, but is different from the vehicle information processing system 1 according to the first embodiment, in that the vehicle calculates the priority of the support information 33. In the fourth embodiment, the same elements as in the first to third embodiments will not be described and the differences therebetween will be described.

Figure 8:
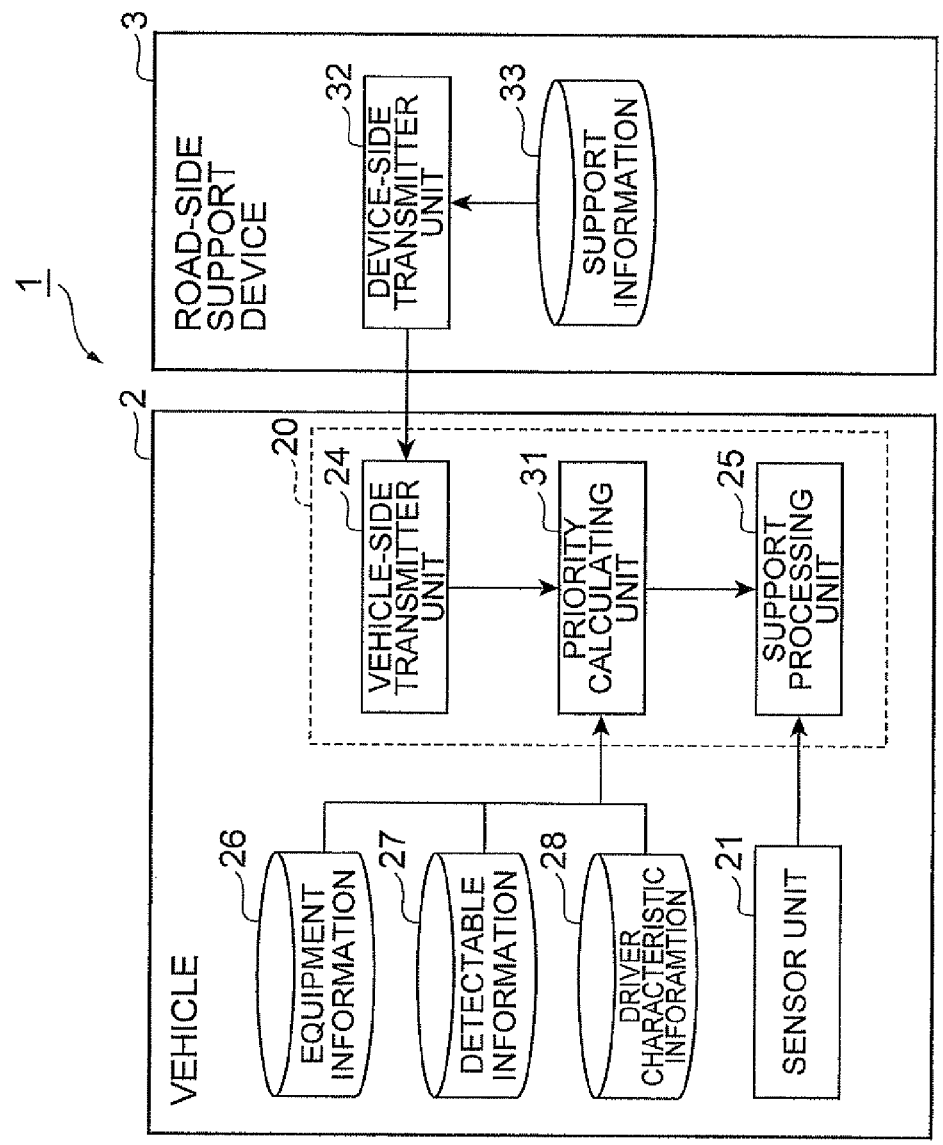
FIG. 8 is a block diagram schematically illustrating the configuration of a vehicle information processing system according to a fourth embodiment of the invention.

FIG. 8 is a block diagram illustrating the configuration of a vehicle information processing system 1 according to this embodiment. As shown in FIG. 8, a vehicle 2 according to the fourth embodiment has almost the same configuration as the vehicle 2 according to the third embodiment, but is different from the vehicle 2 according to the third embodiment, in that the in-vehicle information processing device 20 does not include the vehicle-side transmitter 23 and includes a priority calculating unit 31. This priority calculating unit 31 has almost the same configuration as the priority calculating unit 31 of the road-side support device 3 according to the first embodiment, and has a function of calculating the priority of a service on the basis of support information 33 output from the vehicle-side receiver unit 24, referable equipment information 26, detectable information 27, or driver characteristic information 28. The remaining configuration of the vehicle 2 is the same as the configuration of the vehicle 2 according to the first embodiment.

A road-side support device 3 according to the fourth embodiment has almost the same configuration as the road-side support device 3 according to the first embodiment, but is different from the road-side support device 3 according to the first embodiment, in that it does not include the device-side receiver unit 30.

Figure 9:
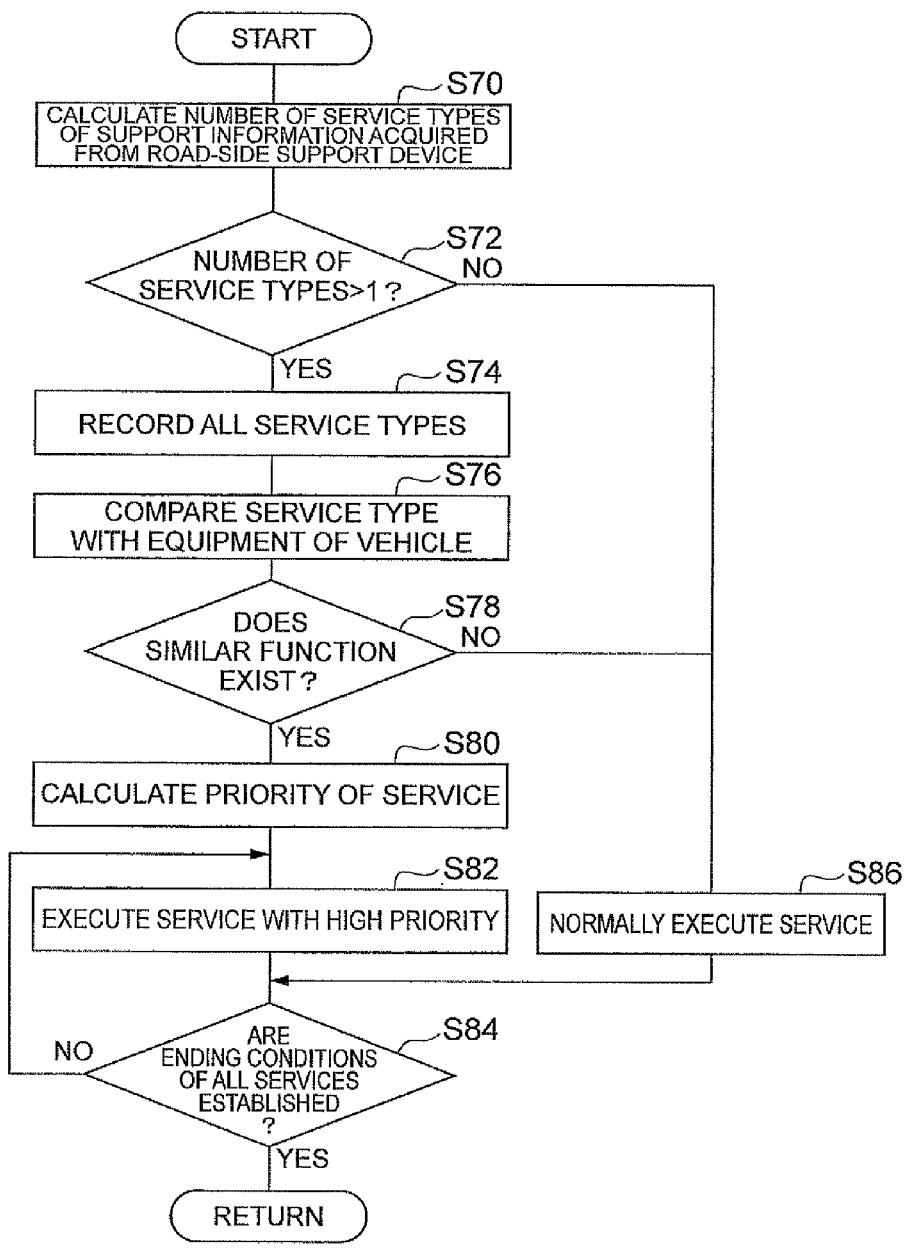
FIG. 9 is a flow diagram illustrating the behavior of an in-vehicle information processing device according to the fourth embodiment of the invention.

The behavior of the vehicle information processing system 1 according to this embodiment will be described below. The behavior of the in-vehicle information processing device 20 will be first described. FIG. 9 is a flow diagram illustrating the behavior of the in-vehicle information processing device 20 according to this embodiment. The control procedure shown in FIG. 9 is repeatedly performed at a predetermined interval, for example, from the time when the vehicle 2 communicates with the road-side support device 3. In consideration of ease of explanation and comprehension, FIG. 9 shows an example where the vehicle 2 calculates the priority of a service using the equipment information 26.

As shown in FIG. 9, the in-vehicle information processing device 20 starts the control procedure from a support information receiving process (S70). The process of S70 is performed, for example, by the vehicle-side receiver unit 24 and the priority calculating unit 31 and is a process of receiving support information 33 from the road-side support device 3 and calculating the number of service types. The vehicle-side receiver unit 24 receives the support information 33 from the road-side support device 3. Thereafter, the priority calculating unit 31 determines the types of services using the received support information 33 and calculates the number of service types. When the process of S70 is ended, a service type number determining process is performed (S72).

The process of S72 is performed by the priority calculating unit 31 and is a process of determining whether the number of service types calculated in the process of S70 is greater than 1. When it is determined in the process of S72 that the number of service types is greater than 1, a recording process is performed (S74).

The process of S74 is performed by the priority calculating unit 31 and is a process of recording the service types calculated in the process of S72. For example, the priority calculating unit 31 records the types of the services using the support information 33 in a memory of the vehicle. When the process of S74 is ended, a comparison process is performed (S76).

The process of S76 is almost the same as the process of S24 shown in FIG. 4 and is a process of comparing the service (the second support) provided from the road-side support device 3 with the service (the first support) provided from the equipment of the vehicle on the basis of the support information 33 and the equipment information 26. For example, the priority calculating unit 31 determines the service types on the basis of the support information 33. Then, similarly to the process of S26 shown in FIG. 4, the priority calculating unit 31 compares the type or details of the service using the support information 33 with the type or details of the service stored in the equipment information 26 and determines whether both services (or functions of both services) are similar to each other (S78). When it is determined in the process of S78 that the service using the support information 33 is similar to the service provided from the equipment specified by the equipment information 26, that is, when it is determined that both services have a similar function, the priority calculating process is performed (S80).

The process of S80 is performed by the priority calculating unit 31 and is a process of calculating the priority of the support information 33 associated with the service having the similar function. This process is almost the same as the priority calculating process performed before being transmitted in the process of S28 shown in FIG. 4. The priority calculating unit 31 calculates the priority of the service having the similar function to be lower than the priorities of the other services. When the process of S80 is ended, the support executing process is performed (S82).

The process of S82 is performed by the support processing unit 25 and is a process of providing a service to the vehicle 2 or the driver. The support processing unit 25 starts the processing from a support with a high priority on the basis of the priority calculated in the process of S82. When the process of S82 is ended, the end determining process is performed (S84).

The process of S84 is performed by the support processing unit 25 and is a process of determining whether an ending condition of the possible services is established. When it is determined in the process of S84 that the ending condition of all the services is not established, the support executing process is performed again (S82). Accordingly, the services are processed depending on the priorities thereof until the ending condition of all the services is established. On the other hand, when it is determined in the process of S84 that the ending conditions of all the services are established, the control procedure shown in FIG. 9 is ended.

When it is determined in the process of S72 that the number of service types is greater than 1, the support executing process is performed (S86). When it is determined in the process of S78 that the service using the support information 33 is not similar to the service provided from the equipment specified by the equipment information 26, that is, when it is determined that both services have different functions, the support executing process is performed (S86).

The process of S86 is performed by the support processing unit 25 and is a process of normally providing the services. When the process of S86 is ended, the end determining process is performed (S84).

In this way, the control procedure shown in FIG. 9 is completed. In the process of S76, the detectable information 27 may be received instead of the equipment information 26 or in addition to the equipment information 26 and the priority may be calculated similarly to the road-side support device 3 according to the first and second embodiments. The equipment information 26 or the detectable information 27 and the driver characteristic information 28 may be combined and the priority may be calculated similarly to the road-side support device 3 according to the third embodiment.

By performing the control procedure shown in FIG. 9, the support information 33 is received from the road-side support device 3, the type of the overlapping services is determined on the basis of the support information 33 and the equipment information 26, the detectable information 27, or the driver characteristic information 28, and one service is preferentially executed. Accordingly, since it is possible to avoid overlapping services being simultaneously provided, it is possible to improve the efficiency of processes and to avoid the driver's confusion. It is also possible to reduce the processing load on the vehicle 2 and thus to rapidly provide a service.

As described above, in the in-vehicle information processing device 20 according to the fourth embodiment, the priority calculating unit 31 of the vehicle 2 can calculate the priority of a service on the basis of the equipment information 26 and the support information 33. Accordingly, for example, even when the details of a service executed using the information acquired in the vehicle 2 overlap with the details of a service using the support information 33 acquired from the road-side support device 3, it is possible to preferentially execute one service. As a result, since it is possible to avoid overlapping services being executed, it is possible to improve the efficiency of processes necessary for vehicle control, driving support, or the like.

In the above-mentioned embodiments, examples of the information providing device according to the invention have been described. The information providing device according to the invention is not limited to the information providing devices according to the above-mentioned embodiments, but the information providing devices according to the embodiments may be modified or applied to various forms without departing from the concept described in the appended claims.

For example, the road-to-vehicle communication in which the vehicle 2 and the road-side support device 3 communicate with each other using the road-side support device 3 as the vehicle-external information source has been described in the above-mentioned embodiments. However, the vehicle-external information source may be another vehicle and a vehicle-to-vehicle communication in which the vehicle 2 and another vehicle communicate with each other may be used.

Although it has been described in the above-mentioned embodiments that the information volume of the support information 33 associated with the support with a low priority is reduced, other information volumes may be increased to correspond to the reduced information volume. For example, by increasing the information volume of the support information 33 associated with another support, it is possible to efficiently provide information necessary for the vehicle 2 or the driver. For example, when the driver sets the equipment of the vehicle 2 to an execution allowed state (ON state), it is possible to increase the information volume by raising the priority of the service provided from the corresponding equipment. Specifically, when the pedestrian information notifying function is set to the OFF state and the signal information notifying function is set to the ON state, the information volume of the pedestrian information is reduced and the number of cycles of the signal information to be transmitted is increased by as much. For example, when a service which cannot be executed by the equipment of the vehicle 2 and a service which can be executed thereby exist, it is possible to increase the information volume by raising the priority of the executable service. Specifically, by transmitting only the remaining distance to a stop line in the road shape information as the support information 33 to the vehicle 2 not having a brake assist function or not including a PCS and providing detailed obstruction guiding information instead, it is possible to finely execute the support.

Although it has been described in the second embodiment that the degree of service is determined using the map information level, the degree of service may be determined using the support level included in the equipment information 26. For example, when the information volume to be notified increases with an increase in the support level, it can be said that the service level of the service from the equipment increases as the support level increases. In the case of equipment which performs the notification of information when the support level is low and which performs the vehicle control when the support level is high, it can be said that the service level of the service from the equipment increases as the support level increases. In this way, the service level of the service from the equipment may be determined on the basis of the support level and the priority of the service may be calculated on the basis of the service level. When the service details of one equipment are the notification of information and the service details of the other equipment are the vehicle control, the service from the equipment performing the vehicle control may be determined to have a higher service level.

Although it has been described in the third embodiment that the determination processes of S54 to S60 are performed, at least one of the determination processes of S54 to S60 has only to be performed. The processes of S54 to S60 may be changed in processing order.

Although it has been described in the fourth embodiment that the service with a high priority is preferentially performed in the process of S82, a service with a priority lower than a predetermined value (for example, 1) may not be performed. According to this configuration, since the services having a similar function are not performed, it is possible to satisfactorily suppress the uselessness of processes and thus to improve the efficiencies of processes.

The invention claimed is:

1. An information providing device which provides support information to a vehicle, comprising:
   a device-side receiver unit that receives equipment information on equipment of the vehicle or detectable information detectable by an in-vehicle unit of the vehicle;
   a priority calculating unit that calculates a priority of a support using the support information on the basis of the equipment information or the detectable information; and
   a device-side transmitter unit that transmits the support information to the vehicle on the basis of the calculated priority,
   wherein the priority calculating unit calculates the priority of a support which cannot be executed by the equipment so as to be lower than other support priorities when the equipment information is received by the device-side receiver unit.

2. The information providing device according to claim 1, wherein the priority calculating unit calculates the priority on the basis of a degree of support from the equipment when the equipment information is received by the device-side receiver unit.

3. The information providing device according to claim 1, wherein the device-side receiver unit receives setting information representing whether the execution for the equipment is allowed as the equipment information, and
   wherein the priority calculating unit calculates the priority of the support from the equipment for which the execution is not allowed so as to be lower than other support priorities when the setting information is received by the device-side receiver unit.

4. The information providing device according to claim 1, wherein the priority calculating unit calculates the priority of the support using the support information overlapping with the detectable information so as to be lower than other support priorities when the detectable information is received by the device-side receiver unit.

5. The information providing device according to claim 1, wherein the device-side receiver unit further receives driving characteristics of a driver of the vehicle, and
   wherein the priority calculating unit calculates the priority of the support on the basis of the driving characteristics of the driver when the driving characteristics of the driver is received by the device-side receiver unit.

6. The information providing device according to claim 1, wherein the device-side transmitter unit transmits the support information in a state where a provision order of the support information associated with the support is set to be lower as the priority of support becomes lower, or transmits the support information in a state where an information volume of the support information associated with the support is reduced to be smaller as the priority of support becomes lower.

7. A vehicle information processing system comprising a vehicle and an information providing device,
   wherein the vehicle includes:
   a vehicle-side transmitter unit that transmits equipment information on equipment of the vehicle or detectable information detectable by an in-vehicle unit of the vehicle to the information providing device; and a vehicle-side receiver unit that receives support information from the information providing device, and wherein the information providing device includes:

a device-side receiver unit that receives the equipment information or the detectable information;

a priority calculating unit that calculates a priority of a support using the support information on the basis of the equipment information or the detectable information; and a device-side transmitter unit that transmits the support information to the vehicle on the basis of the calculated priority, wherein the priority calculating unit calculates the priority of a support which cannot be executed by the equipment so as to be lower than other support priorities when the equipment information is received by the device-side receiver unit.

8. An in-vehicle information processing device that is mounted in a vehicle and that executes a first support on the basis of information acquired by equipment mounted in the vehicle and executes a second support on the basis of information acquired from an vehicle-external information source, the in-vehicle information processing device comprising:

a priority calculating unit that calculates priorities of the first support and the second support on the basis of equipment information on the equipment and the information acquired from the vehicle-external information source; and a processing unit that performs a process associated with the first support or the second support on the basis of the priorities, wherein the priority calculating unit calculates the priority of a support which cannot be executed by the equipment so as to be lower than other support priorities.

* * * * *